(12) United States Patent
Halonen et al.

(10) Patent No.: US 11,511,808 B2
(45) Date of Patent: Nov. 29, 2022

(54) VEHICLE BODY APPARATUS AND SYSTEM INCLUDING A ROCKER INSERT

(71) Applicant: GM GLOBAL TECHNOLOGY OPERATIONS LLC, Detroit, MI (US)

(72) Inventors: Jeffrey R. Halonen, Brighton, MI (US); Terry A. Swartzell, Ann Arbor, MI (US); Yiran Tong, Farmington, MI (US); Luke A. Reini, Clarkston, MI (US); Andrew W. White, Shelby Township, MI (US); Michael D. Regiec, Clarkston, MI (US); Warren J. Parsons, Oakland, MI (US); Monte L. Taylor, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 139 days.

(21) Appl. No.: 17/090,133

(22) Filed: Nov. 5, 2020

(65) Prior Publication Data

US 2022/0135136 A1 May 5, 2022

(51) Int. Cl.
| | |
|---|---|
| *B62D 21/15* | (2006.01) |
| *B62D 25/02* | (2006.01) |
| *B62D 27/02* | (2006.01) |
| *B62D 27/06* | (2006.01) |
| *B62D 29/00* | (2006.01) |

(52) U.S. Cl.
CPC ......... *B62D 21/157* (2013.01); *B62D 25/025* (2013.01); *B62D 27/026* (2013.01); *B62D 27/065* (2013.01); *B62D 27/02* (2013.01); *B62D 29/001* (2013.01); *B62D 29/008* (2013.01)

(58) Field of Classification Search
CPC .... B62D 21/157; B62D 25/025; B62D 27/02; B62D 27/065; B62D 29/001; B62D 29/008
USPC ........................................................ 296/209
See application file for complete search history.

(56) References Cited

U.S. PATENT DOCUMENTS

| 8,926,005 | B2 | 1/2015 | Barz et al. | |
|---|---|---|---|---|
| 10,155,542 | B2 * | 12/2018 | Gao | B62D 21/157 |
| 10,293,860 | B1 * | 5/2019 | Cooper | B62D 25/025 |
| 2020/0114970 | A1 * | 4/2020 | Nusier | B62D 21/157 |

FOREIGN PATENT DOCUMENTS

| DE | 102011115040 A1 | 4/2012 |
|---|---|---|
| DE | 102012020432 B3 | 2/2014 |
| DE | 102018218851 B3 | 10/2019 |
| DE | 102018212906 B3 | 1/2020 |
| WO | WO2020136265 A1 | 7/2020 |

* cited by examiner

*Primary Examiner* — D Glenn Dayoan
*Assistant Examiner* — Dana D Ivey
(74) *Attorney, Agent, or Firm* — Quinn IP Law (57) ABSTRACT

An apparatus for a vehicle body including a rocker insert is provided. The apparatus includes a vehicle body including a plurality of metallic structure members and a lower portion operable to provide support to a floor surface within a passenger compartment of a vehicle and a rocker insert mounted to an in-vehicle side portion of the lower portion. The rocker insert includes an elongated bar portion including a hollow center portion including internal reinforcing web features. The rocker insert is oriented with respect to the vehicle body such that a longitudinal axis of the elongated bar portion of the rocker insert is parallel to an in-vehicle forward direction of the vehicle body.

19 Claims, 6 Drawing Sheets

FIG. 7 ures. The rocker insert is oriented with respect to the vehicle body such that a longitudinal axis of the elongated bar portion of the rocker insert is parallel to an in-vehicle forward direction of the vehicle body.

VEHICLE BODY APPARATUS AND SYSTEM INCLUDING A ROCKER INSERT

INTRODUCTION

The disclosure generally relates to a vehicle body apparatus and system including a rocker insert.

A vehicle includes a vehicle body including a plurality of structural members. Structural members may include a plurality of stamped metal sheets welded or joined together.

A vehicle body is configured to provide structural and torsional rigidity to the vehicle and the passenger compartment of the vehicle. A vehicle body is configured to withstand impact from different angles including a side impact.

SUMMARY

An apparatus for a vehicle body including a rocker insert is provided. The apparatus includes a vehicle body including a plurality of metallic structure members and a lower portion operable to provide support to a floor surface within a passenger compartment of a vehicle and a rocker insert mounted to an in-vehicle side portion of the lower portion. The rocker insert includes an elongated bar portion including a hollow center portion including internal reinforcing web features. The rocker insert is oriented with respect to the vehicle body such that a longitudinal axis of the elongated bar portion of the rocker insert is parallel to an in-vehicle forward direction of the vehicle body.

In some embodiments, the apparatus further includes a spacer operable to create a gap between the lower portion and the rocker insert.

In some embodiments, the elongated bar portion includes a hole or fastener receiving feature, and the spacer includes a spacing rivet hole insert inserted into the hole or fastener receiving feature and including a washer portion disposed between the rocker insert and the lower portion. The apparatus further includes a rivet disposed within the spacing rivet hole insert fastening the rocker insert to the lower portion.

In some embodiments, the rocker insert further includes a mounting tab attached to an elongated side of the elongated bar portion.

In some embodiments, the mounting tab is attached to the lower portion by one of welding, a threaded fastener, a rivet, and an adhesive.

In some embodiments, the elongated bar portion is attached to the lower portion by one of spot welding, a threaded fastener, a rivet, and an adhesive.

In some embodiments, the apparatus further includes an external cover, wherein the external cover is attached on a first side to the lower portion, is attached to a second side to the lower portion, and encapsulates the rocker insert between the external cover and the lower portion.

In some embodiments, the rocker insert is attached to the external cover with adhesive.

In some embodiments, the elongated bar portion includes an external crease running longitudinally along an elongated side of the elongated bar portion.

In some embodiments, the rocker insert further includes a mounting tab attached to an end portion of the elongated bar portion.

According to one alternative embodiment, a system for a vehicle body including a rocker insert is provided. The system includes a vehicle body including a plurality of metallic structure members and a lower portion operable to provide support to a floor surface within a passenger compartment of a vehicle and a first rocker insert mounted to an in-vehicle first side portion of the lower portion. The first rocker insert includes a first elongated bar portion, wherein the first rocker insert is oriented with respect to the vehicle body such that a longitudinal axis of the first elongated bar portion of the first rocker insert is parallel to an in-vehicle forward direction of the vehicle body. The system further includes a second rocker insert mounted to an in-vehicle second side portion of the lower portion. The second rocker insert includes a second elongated bar portion, wherein the second rocker insert is oriented with respect to the vehicle body such that a longitudinal axis of the second elongated bar portion of the second rocker insert is parallel to an in-vehicle forward direction of the vehicle body. The in-vehicle second side portion of the lower portion is on an opposite side of the lower portion from the in-vehicle first side portion of the lower portion. The first elongated bar portion includes a first hollow center portion including first internal reinforcing web features.

In some embodiments, the system further includes a spacer operable to create a gap between the lower portion and the first rocker insert.

In some embodiments, the first elongated bar portion includes a hole or fastener receiving feature, and the spacer includes a spacing rivet hole insert inserted into the hole or fastener receiving feature and including a washer portion disposed between the first rocker insert and the lower portion. The system further includes a rivet disposed within the spacing rivet hole insert fastening the first rocker insert to the lower portion.

In some embodiments, the first rocker insert further includes a mounting tab attached to an elongated side of the first elongated bar portion.

In some embodiments, the mounting tab is attached to the lower portion by one of welding, a threaded fastener, a rivet, and an adhesive.

In some embodiments, the first elongated bar portion is attached to the lower portion by one of spot welding, a threaded fastener, a rivet, and an adhesive.

In some embodiments, the system further includes an external cover, wherein the external cover is attached on a first side to the lower portion, is attached to a second side to the lower portion, and encapsulates the first rocker insert between the external cover and the lower portion.

In some embodiments, the first rocker insert is attached to the external cover with adhesive.

In some embodiments, the first elongated bar portion includes an external crease running longitudinally along an elongated side of the first elongated bar portion.

DETAILED DESCRIPTION

Vehicle bodies include structural members configured to provide structural integrity to the vehicle body, making the vehicle body resistant to deformation from impacts. The impacts may come from various directions in relation to the vehicle body. One direction from which impacts may come are the sides or from a side direction relative to the vehicle.

Vehicle bodies include a lower portion that supports a floor within the passenger compartment. This lower portion may include some flatness or flat portions in order to provide locations for vehicle items to be attached to the lower portion, for example, including passenger seats. Ribs, contours, and other reinforcing features may additionally be formed by stamping, bending, or other processes in the lower portion. Such reinforcing features are useful to make the lower portion of the vehicle body more rigid and resistant to bending as a result of forces or impacts upon the lower portion. Side regions of the lower portion of the vehicle body may be described as a rocker area or rocker panels.

Electric vehicles are vehicles that utilize onboard batteries to provide motive force to the vehicle. Electric vehicles include extensive packs of battery cells that may occupy significant onboard package space within a vehicle. A solution to the space used to store electric vehicle batteries onboard a vehicle is to mount the electric batteries to the lower portion of the vehicle body. Such a configuration of the vehicle provides space in both an under-hood area and a rear trunk area of the vehicle, preventing the batteries from having to be stored in either space. However, positioning or mounting the batteries upon the lower portion of the vehicle body takes up package space within the vehicle that might be used to provide reinforcing features such as ribs and contours in the lower portion of the vehicle body. As a result of reducing or eliminating reinforcing features upon the lower portion of the vehicle body, the lower portion may be less rigid and less resistant to bending.

A rocker insert is provided for reinforcing a lower portion of a vehicle body along the side rocker areas of the lower portion. The rocker insert may include an elongated bar with reinforcing cross-sectional details which are operable to resist bending of the rocker insert. The rocker insert may further include mounting details operable to facilitate handling of or attachment to the vehicle body. The mounting details may include a stand-off feature operable to prevent the rocker insert from touching the vehicle body to facilitate coating the vehicle body and the rocker insert with an anti-corrosive coating.

A vehicle body system is similarly provided including a lower portion of a vehicle body and a rocker insert attached to a side rocker area of the lower portion. The rocker insert is oriented with a longitudinal axis of an elongated bar portion of the rocker insert parallel to an in-vehicle forward direction of the vehicle body. The rocker insert may include an elongated bar with reinforcing cross-sectional details which are operable to resist bending of the rocker insert. The rocker insert may further include mounting details operable to facilitate handling of or attachment to the vehicle body. The mounting details may include a stand-off feature operable to prevent the rocker insert from touching the vehicle body to facilitate coating the vehicle body and the rocker insert with an anti-corrosive coating. The system may include two rocker inserts so attached to the lower portion, one on each side of the lower portion.

Rocker areas are one exemplary location that may benefit from inclusion of the disclosed inserts. However, similar inserts may be utilized in other areas of a vehicle body. For example, other portions of the vehicle body, body panels, roof panels, door panels may include package space challenges that prevent or make impractical formation of reinforcing features upon the portion or panel. An insert or plurality of inserts similar to the inserts disclosed herein may similarly be utilized to reinforce the portion or panel of the vehicle.

Figure 1:
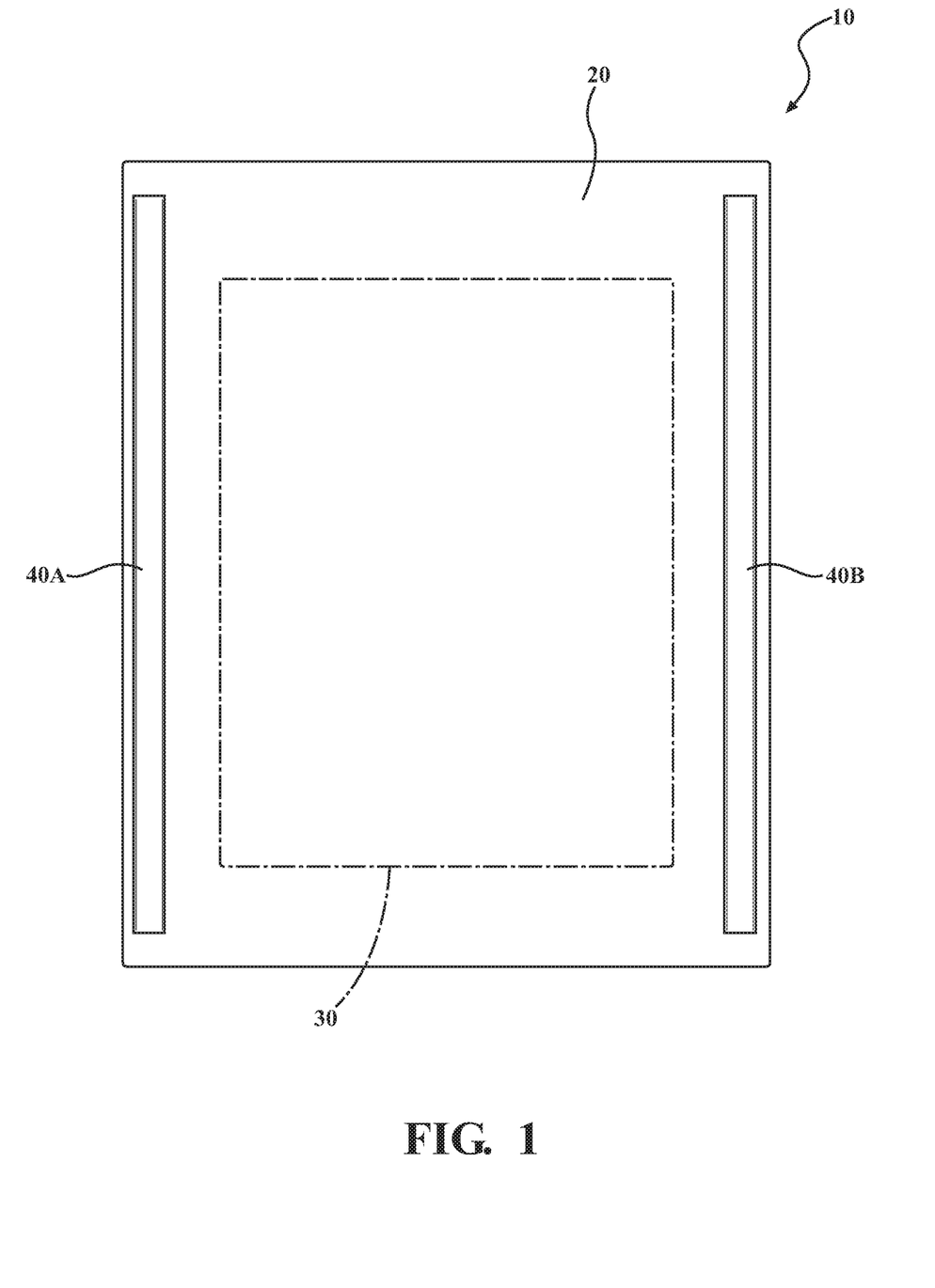
FIG. 1 schematically illustrates in top view an exemplary lower portion of a vehicle body including two rocker inserts, in accordance with the present disclosure.

FIG. 1 schematically illustrates in top view an exemplary lower portion of a vehicle body 10 including two rocker inserts, a left rocker insert 40A and a right rocker insert 40B. The vehicle body 10 is illustrated including a lower portion 20 of the vehicle body 10. The lower portion 20 may be joined to other portions of the vehicle body such as a panel separating the passenger compartment from an under-hood area, a pair of B-pillars dividing a front seat area from a rear seat area and supporting a roof portion of the vehicle body 10, and other portions of the vehicle body 10 defining other areas of the vehicle. The lower portion 20 is illustrated in an orientation where an in-vehicle front portion of the lower portion 20 is located at a top of the figure. The lower portion 20 includes area 30 to which a plurality of batteries may be mounted. The left rocker insert 40A and the right rocker insert 40B are illustrated mounted and attached to each side of the lower portion 20. The left rocker insert 40A and the right rocker insert 40B provide reinforcement to the lower portion 20, such that a force or impact applied to the sides of the lower portion 20 is resisted by the left rocker insert 40A or the right rocker insert 40B.

Figure 2:
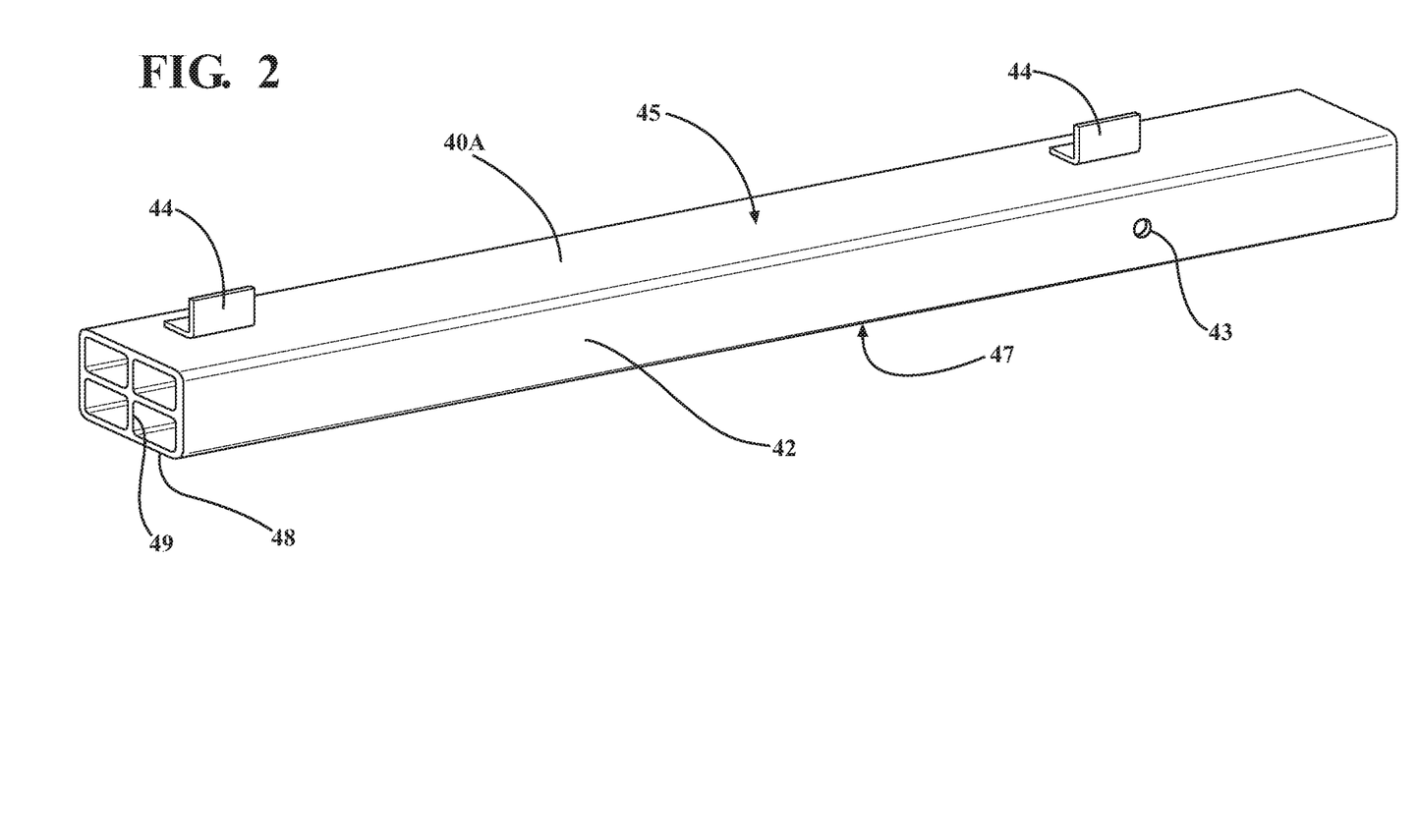
FIG. 2 schematically illustrates in perspective view one of the rocker inserts of FIG. 1, in accordance with the present disclosure.

FIG. 2 schematically illustrates in perspective view the left rocker insert 40A of FIG. 1. The right rocker insert 40B of FIG. 1 may be a mirror image of the left rocker insert 40A of FIG. 2. The left rocker insert 40A is illustrated including an elongated bar portion 42 which may include a common cross-section along a length of the elongated bar portion 42. The elongated bar portion 42 may be hollow. In one embodiment, the elongated bar portion 42 may be created through extrusion. In another embodiment, the elongated bar portion 42 may be created by creating longitudinal bends in an initially flat metallic plate. An end portion 48 of the elongated bar portion 42 is illustrated including a hollow center including reinforcing web features 49 which extend through a middle of the elongated bar portion 42. Two mounting tab features 44 are illustrated attached to one of the elongated sides of the elongated bar portion 42 or, in the embodiment of FIG. 2, to a top 45 of the elongated bar portion 42. Similar mounting tab features may be disposed upon a bottom portion 47 of the elongated bar portion 42 or a portion of the elongated bar portion 42. The elongated bar portion 42 is illustrated with a square cross-section. Alternatively, the elongated bar portion 42 may include a rectangular, circular, triangular, or other cross section shape. The elongated bar portion 42 further includes two holes or fastener receiving features 43 which may be formed by drilling or other methods and enables later fastener connection to the left rocker insert 40A. The mounting tabs features 44 are riveted to a top of the insert and enable a common body assembly with alternate insert material or configurations. Such a mounting tab configuration is a modular design and enables a single body shop build process and equipment configurations while varying the rocker insert material or shapes to meet different architecture or vehicle requirements.

Figure 3:
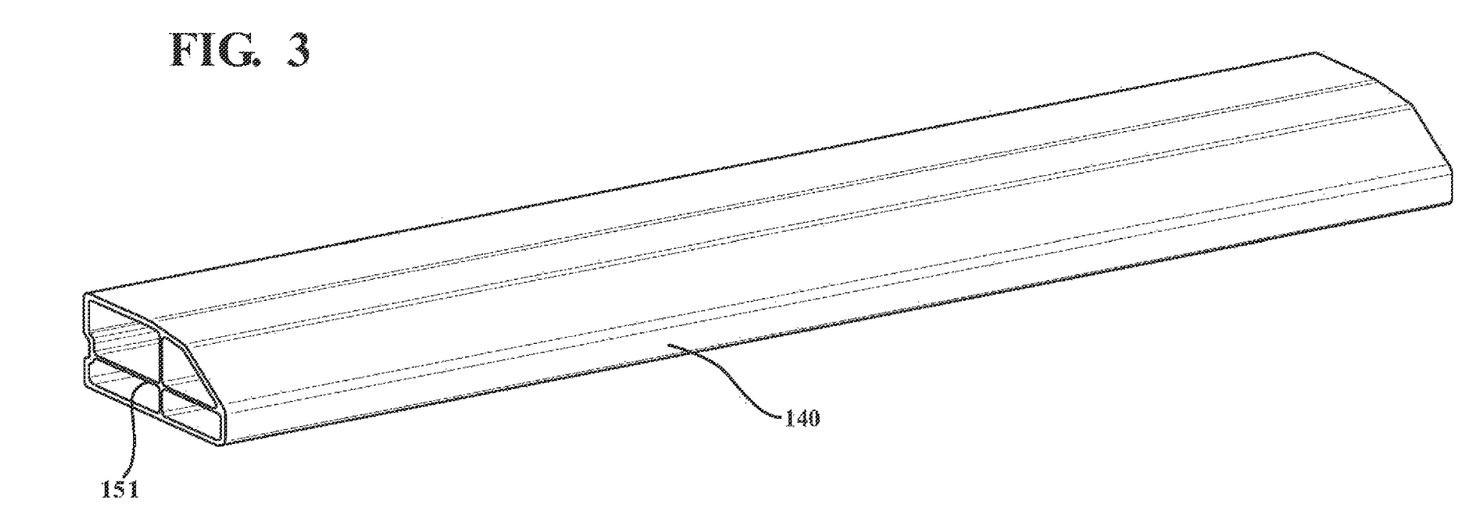
FIG. 3 schematically illustrates in perspective view an alternative rocker insert, in accordance with the present disclosure.
Figure 4:
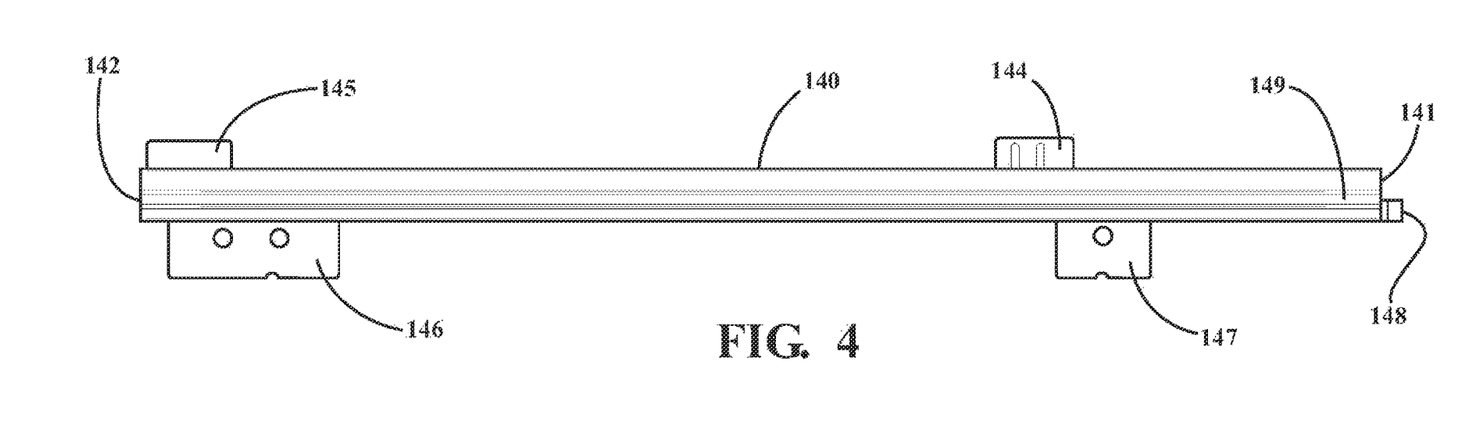
FIG. 4 schematically illustrates in side view the rocker insert of FIG. 3, in accordance with the present disclosure.

FIG. 3 schematically illustrates in perspective view an alternative rocker insert 140. The rocker insert 140 is illustrated including an elongated bar portion which may include a common cross-section along a length of the elongated bar portion. The elongated bar portion may be hollow. In one embodiment, the elongated bar portion may be created through extrusion. In another embodiment, the elongated bar portion may be created by creating longitudinal bends in an initially flat metallic plate. An end portion of the elongated bar portion is illustrated including a hollow center including reinforcing web features 151 which extend through a middle of the elongated bar portion. The elongated bar portion is illustrated with a complex, five-sided cross-section. FIG. 4 schematically illustrates in side view the rocker insert 140. The elongated bar portion includes a reinforcing external crease 149 extending longitudinally down the elongated bar portion of rocker insert 140. The elongated bar portion includes a first end portion 142 and a second end portion 141. The rocker insert of FIG. 4 additionally illustrates optional mounting tabs. A mounting tab 146 and a mounting tab 147 are illustrated attached to a bottom surface of the elongated bar portion of the rocker insert 140. A mounting tab 144 and a mounting tab 145 are illustrated attached to a top surface of the elongated bar portion of the rocker insert 140. A mounting tab 148 is illustrated attached to the second end portion 141.

Figure 5:
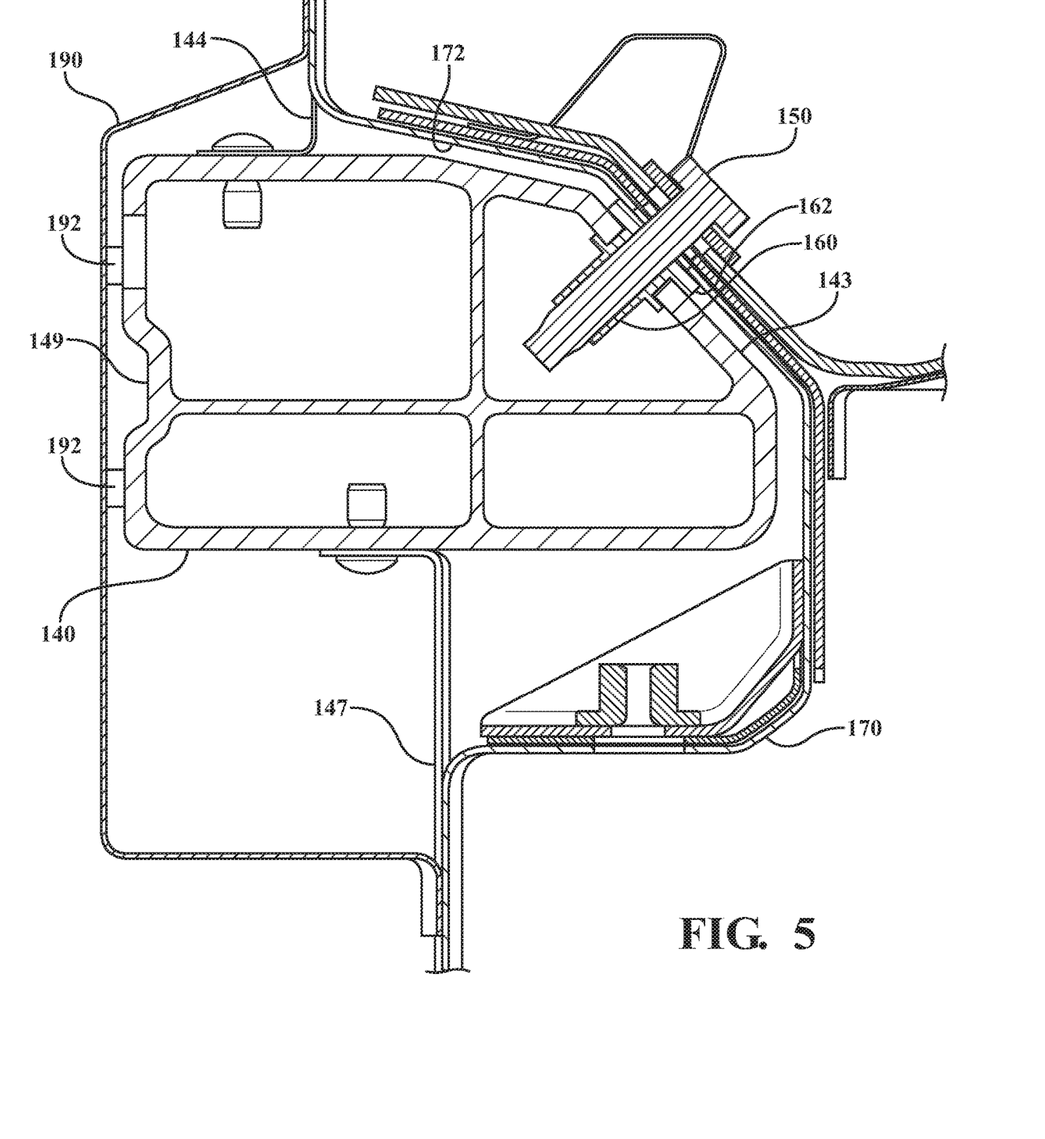
FIG. 5 schematically illustrates in front sectional view the rocker insert of FIG. 4 installed to a lower portion of a vehicle body, in accordance with the present disclosure.

FIG. 5 schematically illustrates in front sectional view the rocker insert 140 of FIG. 4 installed to a lower portion 170 of a vehicle body. The rocker insert 140 is illustrated including the external crease 149 and an angled side portion 143. In another embodiment, the sides of the rocker insert may be flat without a crease. The rocker insert 140 is additionally illustrated including the mounting tab 144 attached to a top of the rocker insert 140 and the mounting tab 147 attached to a bottom of the rocker insert 140. Each of the mounting tab 144 and the mounting tab 147 are attached to lower portion 170. Attachment of the mounting tabs and other portions of the rocker insert 140 to the lower portion 170 may include joining methods in the art, including but not limited to spot welding, attachment by threaded fastener, attachment by rivet, attachment by adhesive, or attachment by other similar device or method.

The vehicle body is coated with layers of paint and anti-corrosive treatments as part of an assembly process. One such anti-corrosive treatment is electro-coat paint operation (ELPO). Such treatments involve immersion and/or exposing the surfaces of the vehicle body to a spray. Attachment of the rocker insert 140 to the lower portion 170 and/or other portions of the vehicle body 10 may be advantageously achieved by maintaining a minimum spacing between the rocker insert 140 and the portion of the vehicle body 10. A spacer may be provided to provide spacing or a gap between the rocker insert and the portion of the vehicle body 10. In the embodiment of FIG. 5, the spacer is embodied as a spacing rivet holder 160 fitted within a hole or fastener receiving feature of the angled side portion 143. The spacing rivet holder 160 includes an external washer surface 162 which maintains a gap between the angled side portion 143 and the lower portion 170. In one embodiment, the spacing rivet holder 160 may be operable to maintain a three millimeter gap between the angled side portion 143 and a surface 172 of the lower portion 170. Rivet 150 is fastened through a hole or fastener receiving feature in the lower portion 170 and into the spacing rivet holder 160, fastening the rocker insert 140 to the lower portion 170 while maintaining a gap therebetween. Additionally, an external cover 190 is illustrated covering the rocker insert 140. The external cover 190 is attached on a first side to the lower portion 170, is attached to a second side to the lower portion 170, and encapsulates the rocker insert 140 between the external cover 190 and the lower portion 170. Adhesive 192 may be used to adhere the rocker insert 140 to the external cover 190. In another embodiment, the spacer may include a round washer, and rivet 150 may be replaced with a bolt or a screw useful to fasten the rocker insert 140 to the lower portion 170.

The rocker insert 140 of FIG. 5 is illustrated including a vertical and horizontal web pattern on an interior of the rocker insert 140. The illustrated web pattern is formed unitarily with the exterior of the rocker insert 140. Such a unitary configuration may be created through extrusion. The rocker insert 140 may be fabricated with aluminum, steel, titanium, composite materials, carbon fibers, carbon fiber reinforced plastics, or other similar materials.

Figure 6:
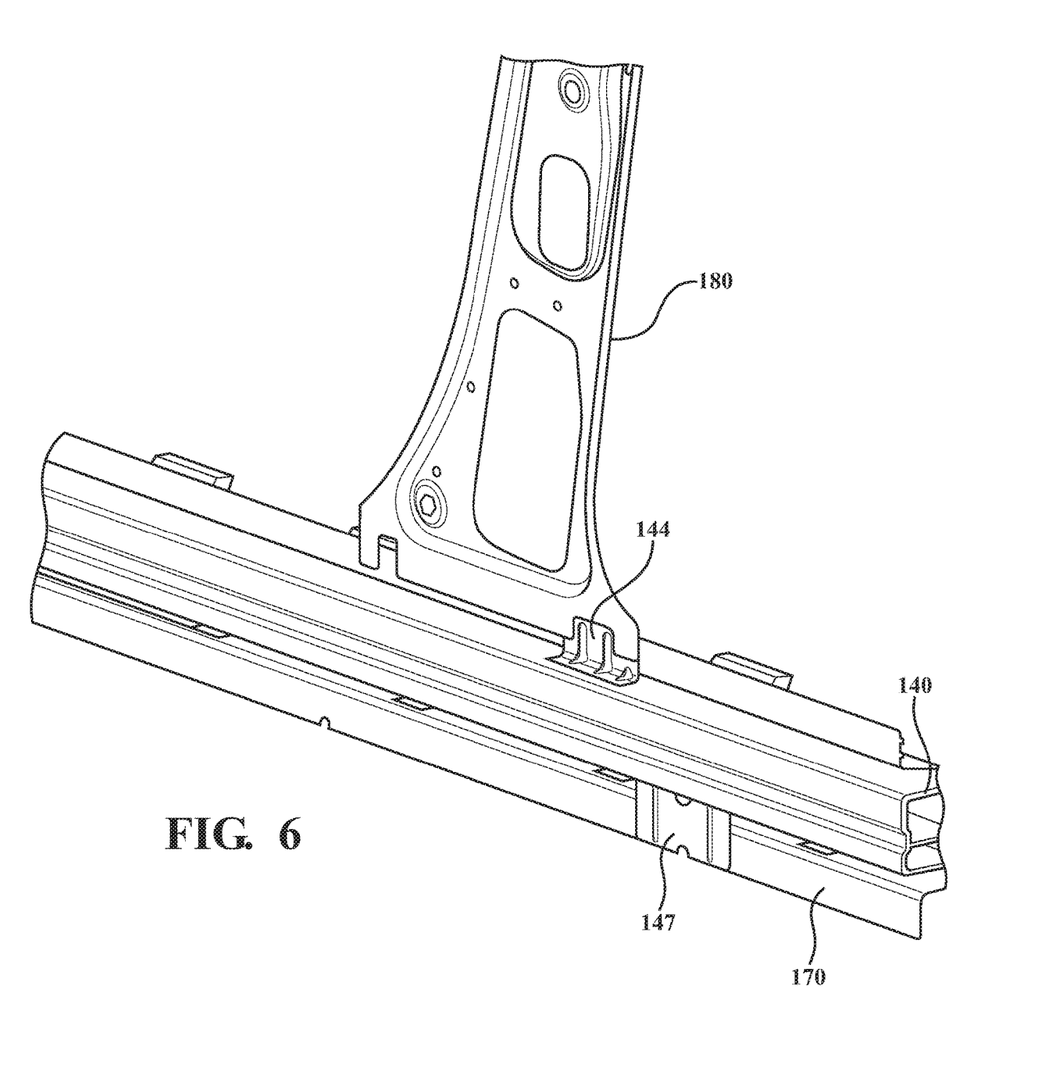
FIG. 6 schematically illustrates in perspective view the rocker insert and the lower portion of the vehicle body of FIG. 5, in accordance with the present disclosure.

FIG. 6 schematically illustrates in perspective view the rocker insert 140 and the lower portion 170 of the vehicle body 10 of FIG. 5. The rocker insert 140 is illustrated attached to the lower portion 170, with the mounting tab 144 and the mounting tab 147 providing attachment to the lower portion 170. Additionally, a B-pillar member 180 is provided attached to the lower portion 170. Forces applied to different portions of the vehicle body 10 are transmitted through the various structural members of the vehicle body 10. Force from a roof structure may be transmitted through the B-pillar member 180, and the rocker insert 140 may provide rigidity to the vehicle body 10 to manage the force applied by the B-pillar member 180.

Figure 7:
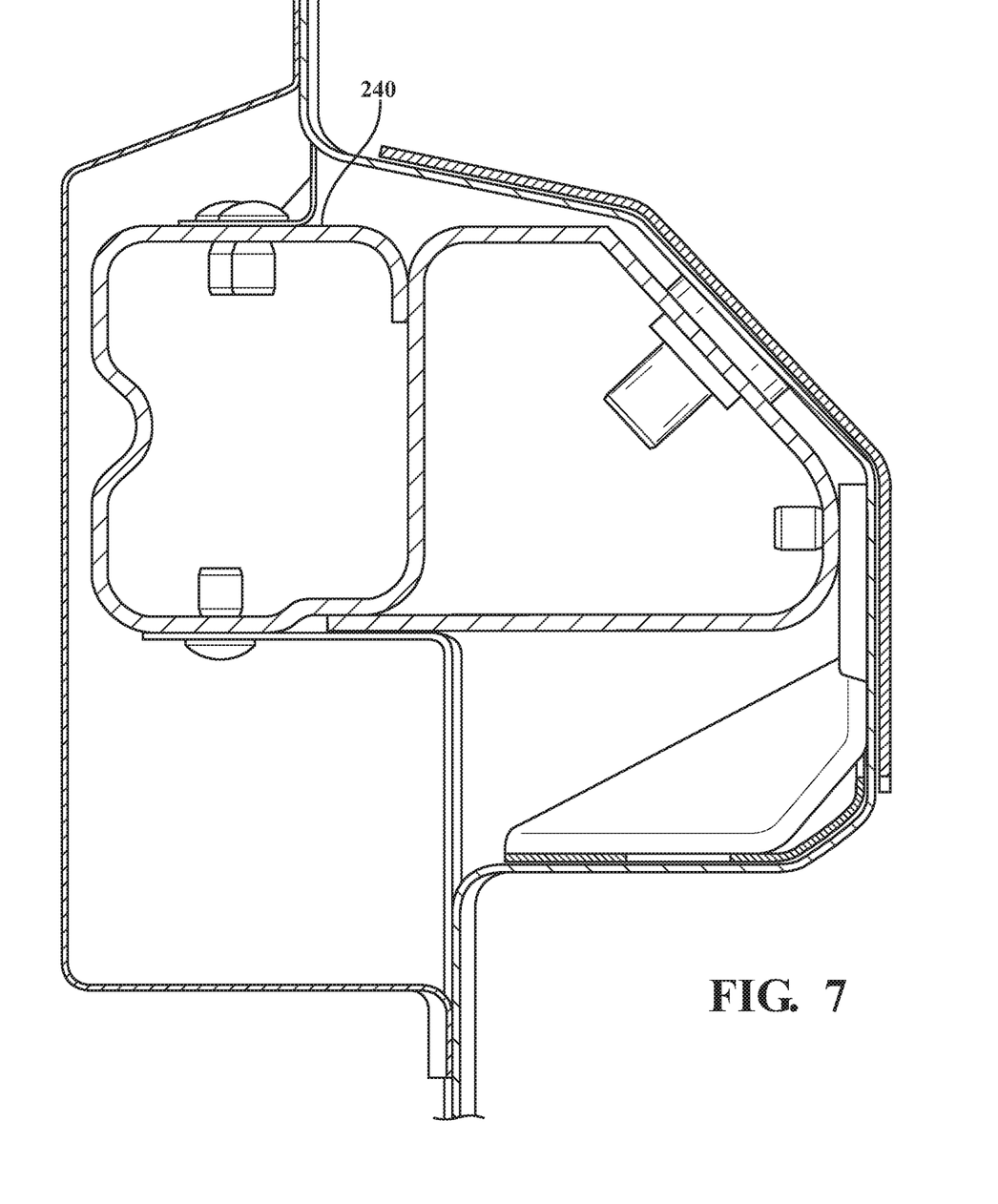
FIG. 7 schematically illustrates in front section view an additional alternative rocker insert fabricated by bending metal into a desired cross section, in accordance with the present disclosure.

The insert described in FIGS. 1-6 may be fabricated from many different materials, aluminum, steel, composite, carbon fiber, etc. FIG. 7 schematically illustrates in front section view an additional alternative rocker insert 240 fabricated by bending metal into a desired cross section. According to one embodiment, the elongated bar portion of FIG. 7 is fabricated with a roll formed steel process. The rocker insert 240 is illustrated including an originally flat metallic piece that has been transformed through a series of longitudinal bending operations into an elongated bar portion including a vertical web portion on an interior of the elongated bar portion. A wide variety of cross-sectional shapes, outer shapes, length to width ratios, and other parameters of the rocker insert may vary, and the disclosure is not intended to be limited to the examples provided herein.

While the best modes for carrying out the disclosure have been described in detail, those familiar with the art to which this disclosure relates will recognize various alternative designs and embodiments for practicing the disclosure within the scope of the appended claims.

What is claimed is:

1. An apparatus for a vehicle body including a rocker insert, comprising:
    a vehicle body including a plurality of metallic structure members and a lower portion operable to provide support to a floor surface within a passenger compartment of a vehicle; and
    a rocker insert mounted to an in-vehicle side portion of the lower portion including an elongated bar portion including a hollow center portion including internal reinforcing web features, wherein the rocker insert is oriented with respect to the vehicle body such that a longitudinal axis of the elongated bar portion of the rocker insert is parallel to an in-vehicle forward direction of the vehicle body, wherein the elongated bar portion has a common cross section along the longitudinal axis of the elongated bar portion and wherein the reinforcing web features extend through the elongated bar portion.

2. The apparatus of claim 1, further comprising a spacer operable to create a gap between the lower portion and the rocker insert.

3. The apparatus of claim 2, wherein the elongated bar portion includes a fastener receiving feature;
wherein the spacer includes a spacing rivet hole insert inserted into the fastener receiving feature and including a washer portion disposed between the rocker insert and the lower portion; and
further comprising a rivet disposed within the spacing rivet hole insert fastening the rocker insert to the lower portion.

4. The apparatus of claim 1, wherein the rocker insert further includes a mounting tab attached to an elongated side of the elongated bar portion.

5. The apparatus of claim 4, wherein the mounting tab is attached to the lower portion by one of welding, a threaded fastener, a rivet, and an adhesive.

6. The apparatus of claim 1, wherein the elongated bar portion is attached to the lower portion by one of spot welding, a threaded fastener, a rivet, and an adhesive.

7. The apparatus of claim 1, further comprising an external cover, wherein the external cover is attached on a first side to the lower portion, is attached to a second side to the lower portion, and encapsulates the rocker insert between the external cover and the lower portion.

8. The apparatus of claim 7, wherein the rocker insert is attached to the external cover with adhesive.

9. The apparatus of claim 1, wherein the elongated bar portion includes an external crease running longitudinally along an elongated side of the elongated bar portion.

10. The apparatus of claim 1, wherein the rocker insert further includes a mounting tab attached to an end portion of the elongated bar portion.

11. A system for a vehicle body including a rocker insert, comprising:
a vehicle body including a plurality of metallic structure members and a lower portion operable to provide support to a floor surface within a passenger compartment of a vehicle; and
a first rocker insert mounted to an in-vehicle first side portion of the lower portion and including a first elongated bar portion including a first hollow center portion including a first set of internal reinforcing web features, wherein the first rocker insert is oriented with respect to the vehicle body such that a longitudinal axis of the first elongated bar portion of the first rocker insert is parallel to an in-vehicle forward direction of the vehicle body, wherein the first elongated bar portion has a first common cross section along the longitudinal axis of the first elongated bar portion and wherein the first set of reinforcing web features extend through the elongated bar portion; and
a second rocker insert mounted to an in-vehicle second side portion of the lower portion and including a second elongated bar portion including a second hollow center portion including a second set of internal reinforcing web features, wherein the second rocker insert is oriented with respect to the vehicle body such that a longitudinal axis of the second elongated bar portion of the second rocker insert is parallel to an in-vehicle forward direction of the vehicle body, wherein the second elongated bar portion has a second common cross section along the longitudinal axis of the second elongated bar portion and wherein the second set of reinforcing web features extend through the elongated bar portion; and
wherein the in-vehicle second side portion of the lower portion is on an opposite side of the lower portion from the in-vehicle first side portion of the lower portion.

12. The system of claim 11, further comprising:
a spacer operable to create a gap between the lower portion and the first rocker insert.

13. The system of claim 12, wherein the first elongated bar portion includes a fastener receiving feature;
wherein the spacer includes a spacing rivet hole insert inserted into the fastener receiving feature and including a washer portion disposed between the first rocker insert and the lower portion; and
further comprising a rivet disposed within the spacing rivet hole insert fastening the first rocker insert to the lower portion.

14. The system of claim 11, wherein the first rocker insert further includes a mounting tab attached to an elongated side of the first elongated bar portion.

15. The system of claim 14, wherein the mounting tab is attached to the lower portion by one of welding, a threaded fastener, a rivet, and an adhesive.

16. The system of claim 11, wherein the first elongated bar portion is attached to the lower portion by one of spot welding, a threaded fastener, a rivet, and an adhesive.

17. The system of claim 11, further comprising an external cover, wherein the external cover is attached on a first side to the lower portion, is attached to a second side to the lower portion, and encapsulates the first rocker insert between the external cover and the lower portion.

18. The system of claim 17, wherein the first rocker insert is attached to the external cover with adhesive.

19. The system of claim 11, wherein the first elongated bar portion includes an external crease running longitudinally along an elongated side of the first elongated bar portion.

* * * * *